E. F. BENOIT.
LOAF SUGAR SCOOP.
APPLICATION FILED FEB. 16, 1914.
1,104,097.
Patented July 21, 1914.
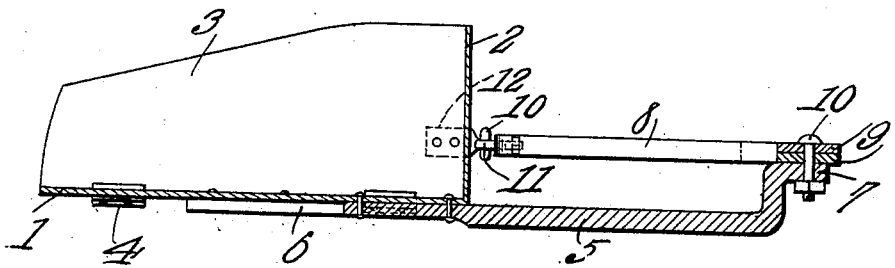
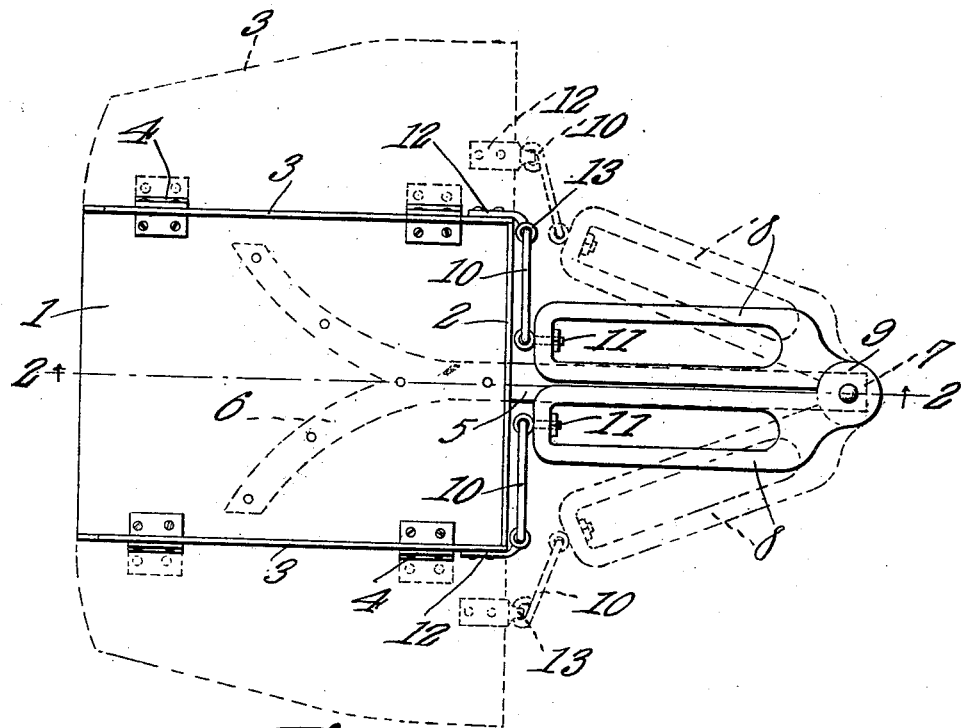
Witnesses
E. F. Benoit,
Inventor
by C. A. Snow & Co.
Attorneys

UNITED STATES PATENT OFFICE.

ELPHEGE F. BENOIT, OF NORTH YAKIMA, WASHINGTON.

LOAF-SUGAR SCOOP.

1,104,097. Specification of Letters Patent. Patented July 21, 1914.

Application filed February 16, 1914. Serial No. 819,043.

*To all whom it may concern:*

Be it known that I, ELPHEGE F. BENOIT, a citizen of the United States, residing at North Yakima, in the county of Yakima and State of Washington, have invented a new and useful Loaf-Sugar Scoop, of which the following is a specification.

The present invention appertains to scoops, and aims to provide a novel and improved scoop for loaf or cube sugar.

It is the object of the present invention to provide a sugar scoop of unique construction, which may be readily manipulated to extract loaf sugar from a bin or container, without the liability of breaking the lumps or cubes of sugar, and to enable the loaf sugar to be conveniently withdrawn from the bin or container.

It is also within the scope of the present invention to provide a scoop of the nature indicated, which will be comparatively simple, substantial and inexpensive in construction, as well as simple, convenient, practical and efficient in its use.

The invention has been illustrated in its preferred embodiment in the accompanying drawing, wherein:—

Figure 1 is a plan view of the improved scoop, illustrating the parts in closed or folded position in full lines, and in unfolded or opened condition in dotted lines. Fig. 2 is a longitudinal section of the scoop, taken on the line 2—2 of Fig. 1.

In carrying out the present invention, the scoop embodies a bottom 1 and an integral or rigid end piece 2, and a pair of side members or wings 3 hinged or pivoted to the side edges of the bottom 1, by means of hinges 4. Certain leaves of the hinges 4 are pivoted or secured upon the upper face of the bottom 1, adjoining the side edges thereof, while the other leaves of the hinges are riveted or otherwise secured to the outer faces of the sides or wings 3. The sides or wings 3 are thus permitted to swing against the inner end piece 2, at right angles to the bottom 1, to form the scoop proper, and are also arranged to swing away from the end piece 2, and into the plane of the bottom 1, as suggested in dotted lines in Fig. 1.

A shank 5 having a fork 6 at its outer end, is provided for the scoop, the fork 6 being riveted or otherwise secured to the lower face of the bottom 1, so that the shank 5 projects beyond the inner end piece 2. The inner end of the shank 5 is offset, as at 7, in the direction toward which the end piece 2 projects, for the purpose which will presently appear.

In order to facilitate the opening and closing of the sides or wings 3, a pair of complemental slotted or loop shaped handles 8 are pivotally carried by the shank 5, the handles or hand-holes having overlapping ears 9 at their butt ends, which ears rest upon the offset portion 7 of the shank, a pivot bolt or member 10 being engaged through the ears 9 and the offset portion 7, to pivot the handles to the inner or rear end of the shank. The free ends of the handles project outwardly, and terminate adjoining the end piece 2 of the scoop, the handles being arranged to swing to and from each other.

Links 10 connect the free ends of the handles 8 and the rear ends of the sides or wings 3, whereby when the handles are swung together and apart, the sides or wings will be swung to closed and open positions, respectively. In order to operatively connect the links 10 to the handles and sides or wings, the ends of the links 10 may be formed with eyes, the eyes at the adjoining ends of the links being engaged to eye bolts 11 engaged to the free ends of the handles 8, and the eyes at the remote ends of the links being engaged to the eyes 13 formed upon pieces or members 12 riveted or otherwise secured to the outer faces of the rear end portions of the sides or wings 3, the eyes 13 projecting beyond the rear ends of the said wings.

It is to be noted that the handles 8 are disposed in a plane above the plane of the bottom 1, whereby the sides or wings 3 may be properly swung, when the handles are moved to and from each other, the handles being slotted or loop shaped, to readily accommodate the fingers and thumb of the hand.

The bottom plate 1, and its end piece 2, and the sides or wings 3 are preferably constructed of sheet aluminum, or other light stock, which is also true of the shank 5 and handles 8, it being understood, of course, that various materials may be employed for the several parts, and that the scoop may be constructed in various sizes, according to the circumstances.

In use, when the handles 8 are grasped by the hand of the operator, the handles may be swung apart, to swing the sides or wings 3 open, into the plane of the bottom 1, whereby the bottom 1 and sides or wings 3 may be inserted readily along the side or bottom of a sugar bin or container, without the liability of breaking the lumps or cubes of sugar, as is occasioned by the insertion of an ordinary scoop into a loaf sugar bin. Then, after the scoop has been properly inserted into the bin or box, the handles 8 may be swung together, to thereby close the scoop, the sides or wings 3 being swung toward each other to retain the lumps or cubes of sugar upon the bottom 1. The scoop may then be withdrawn from the bin or container, and may be dumped or discharged in the usual manner. It is thus an easy matter for the operator to open and close the scoop, prior to and subsequent to the insertion of the scoop into the loaf sugar bin for the purposes indicated, it being noted that the handles 8 have their free ends linked to the sides or wings 3, and have their butt ends pivoted to the shank, whereby the handles in being grasped by the hand will serve to conveniently lift or carry the scoop.

From the foregoing, taken in connection with the drawing, the several advantages and capabilities of the present scoop will be obvious to those versed in the art, and further comment is deemed unnecessary.

Having thus described the invention what is claimed as new is:

1. A scoop embodying a bottom, sides hinged thereto, and manually controllable means operatively connected to the sides for swinging the same to and from each other.

2. A scoop comprising a bottom, sides hinged thereto, a shank attached to the bottom, and manually controllable means carried by the shank and operatively connected to the sides for swinging the same to and from each other.

3. A scoop embodying a bottom, sides hinged thereto, a pair of complemental handles, movable to and from each other, and means operatively connecting the handles and sides for swinging the latter to and from each other.

4. A scoop comprising a bottom, sides hinged thereto, a shank attached to the bottom, handles carried by the shank and movable to and from each other, and means operatively connecting the handles and sides for swinging the latter to and from each other.

5. A scoop comprising a bottom, sides hinged thereto, a pair of complementing pivoted handles, and links connecting the free ends of the handles and the sides, for swinging the sides to and from each other.

6. A scoop comprising a bottom, sides hinged thereto, a shank attached to the bottom, a pair of complemental handles pivoted to the shank, and links connecting the free ends of the handle and the sides for swinging the latter to and from each other.

7. A scoop comprising a bottom having an inner end piece, sides hinged to the side edges of the bottom, a shank attached to the bottom and projecting beyond the said end piece, the inner end of the shank being offset, a pair of complemental handles pivoted to the said offset end of the shank and having their free ends arranged adjoining the said end piece, and links connecting the free ends of the handles and the inner ends of the sides, for swinging the latter to and from the said end piece.

In testimony that I claim the foregoing as my own, I have hereto affixed my signature in the presence of two witnesses.

ELPHEGE F. BENOIT.

Witnesses:
RAOUL S. BENOIT,
J. T. WISER.